US011605307B2

(12) United States Patent
Alapati et al.

(10) Patent No.: US 11,605,307 B2
(45) Date of Patent: Mar. 14, 2023

(54) ASSESSING STUDENT UNDERSTANDING

(71) Applicant: International Business Machines Corporation, Armonk, NY (US)

(72) Inventors: Amritha Alapati, Madhapur (IN); Prasad Velagapudi, Visakhapatnam (IN); Vikas K. Manoria, Bengaluru (IN)

(73) Assignee: International Business Machines Corporation, Armonk, NY (US)

( * ) Notice: Subject to any disclaimer, the term of this patent is extended or adjusted under 35 U.S.C. 154(b) by 308 days.

(21) Appl. No.: 16/655,701

(22) Filed: Oct. 17, 2019

(65) Prior Publication Data

US 2021/0118321 A1   Apr. 22, 2021

(51) Int. Cl.
  *G09B 19/00*  (2006.01)
  *G09B 7/04*  (2006.01)
(52) U.S. Cl.
  CPC .............. *G09B 19/00* (2013.01); *G09B 7/04* (2013.01)
(58) Field of Classification Search
  None
  See application file for complete search history.

(56) References Cited

U.S. PATENT DOCUMENTS

| 5,934,910 | A | 8/1999 | Ho |
| 9,633,309 | B2 | 4/2017 | Giffels et al. |
| 2004/0110120 | A1 | 6/2004 | Ho et al. |
| 2011/0125734 | A1 | 5/2011 | Duboue et al. |
| 2016/0180216 | A1 | 6/2016 | Allen et al. |
| 2017/0206154 | A1 | 7/2017 | Kochura et al. |

FOREIGN PATENT DOCUMENTS

WO   WO2015/039214 A1   3/2015

OTHER PUBLICATIONS

Coutinho, Maria J. et al., "Promoting Student Questioning in the Learning of Natural Sciences", Procedia—Social and Behavioral Sciences, vol. 116, Feb. 21, 2014, 5 Pages.
Schwartz, Katrina, "For Students, Why the Question is More Important Than the Answer", https://www.kqed.org/mindshift/24472/for-students-why-the-question-is-more-important-than-the-answer, Oct. 26, 2012, 6 pages.

*Primary Examiner* — James B Hull
(74) *Attorney, Agent, or Firm* — Stephen J. Walder, Jr.; Steven Bouknight

(57) ABSTRACT

A mechanism is provided to implement a student understanding cognitive assessment computing system for assessing a student's understanding of a subject or topic of a course based on the quality of questions prepared by the student. Responsive to the student completing a review of a portion of course content, the student is prompted to generate a set of questions associated with a topic associated with the portion of the course content. For each question generated by the student, a comprehension score is determined based the question's content and intent; and, responsive to the comprehension score being at or above a predetermined acceptance level and at or above a predetermined decisive level, an answer is generated to the question. Responsive to the student assessing each answer to each question in the set of questions, a final understanding score value is established for the set of questions.

20 Claims, 5 Drawing Sheets

ASSESSING STUDENT UNDERSTANDING

BACKGROUND

The present application relates generally to an improved data processing apparatus and method and more specifically to mechanisms for assessing a student's understanding of a subject or topic of a course based on the quality of questions prepared by a student based on learned content associated with the course.

Children, students, new recruits, or the like, learn by asking questions. Innovators understand clients' needs by asking questions. It is the simplest and most effective way of learning. Brilliant thinkers never stop asking questions because they know that this is the best way to gain deeper insights. Contrary to that, in traditional classrooms, it's the teacher who asks more questions than students. Students are encouraged to absorb the knowledge and/or information imparted by teachers so they may answer a teacher's questions to gauge and/or test their comprehension, but this is a passive model. In an exam, students are given questions and graded on the quality of their solutions. There are plenty of assessment systems where the same process steps are being followed—(1) ask the students to take tutorials, (2) give a questionnaire to evaluate a student's understanding, and (3) calculate scores based on the quality of answers. The scores would decide how well the student understands the concepts.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided, in a data processing system comprising a processor and a memory, the memory comprising instructions that are executed by the processor to configure the processor to implement a student understanding cognitive assessment computing system for assessing a student's understanding of a subject or topic of a course based on the quality of questions prepared by the student based on learned content associated with the course. The illustrative embodiment prompts the student to generate a set of questions associated with a topic associated with the portion of the course content based on the student's understanding of the topic in response to the student completing a review of a portion of course content. For each question generated by the student, the illustrative embodiment determines a comprehension score based the question's content and intent and generates an answer to the question with a calculated error of randomized magnitude from relevant topic content initially ingested by the student understanding cognitive assessment computing system in response to the comprehension score being at or above a predetermined acceptance level and at or above a predetermined decisive level. The illustrative embodiment establishes a final understanding score value for the set of questions based on the assessment provided by the student indicating an understanding of the topic associated with the portion of the course content by the student in response to the student assessing each answer to each question in the set of questions.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
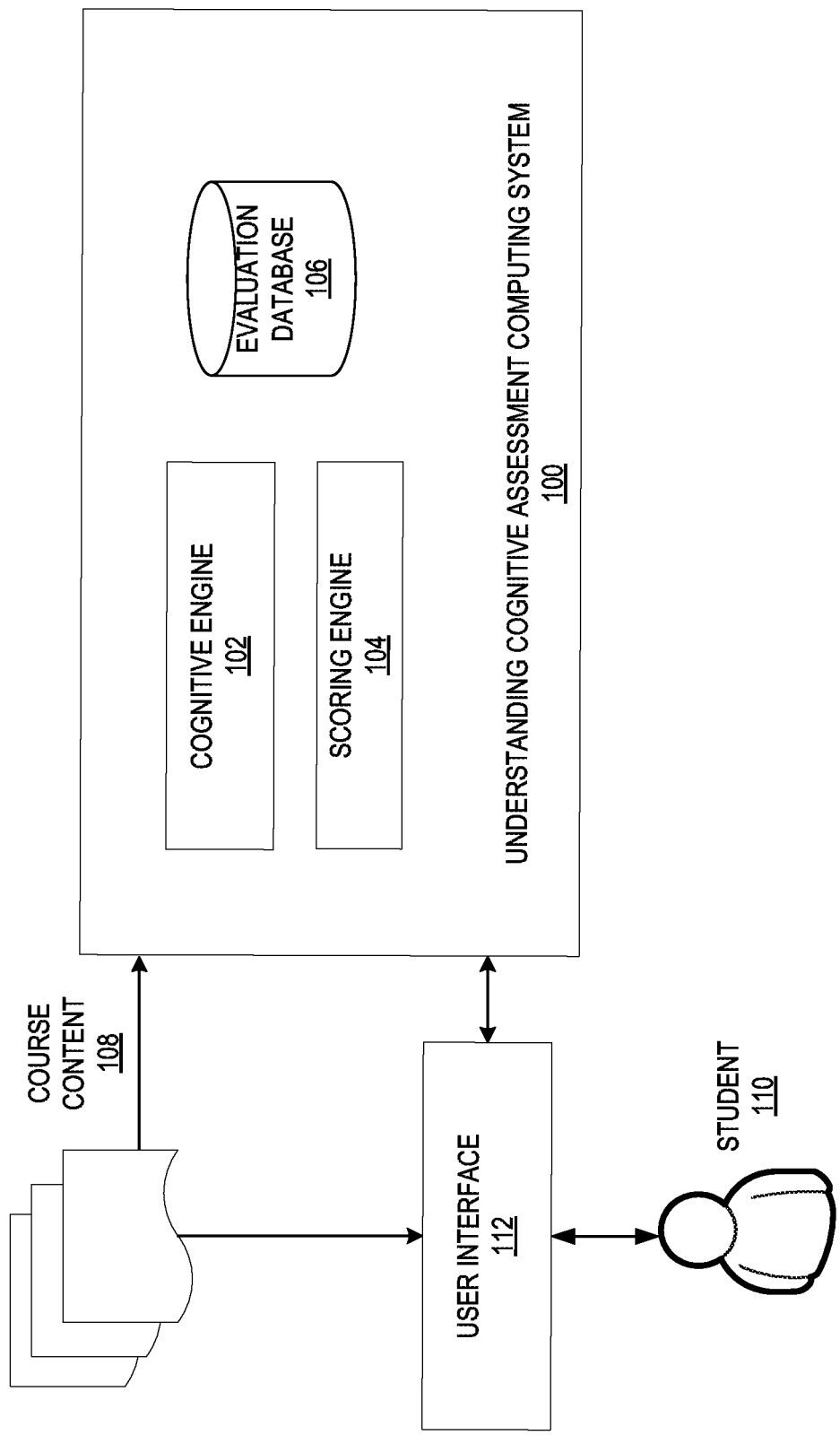
FIG. 1 is an example block diagram illustrating components of a student understanding cognitive assessment computing system for assessing a student's understanding of a subject or topic of a course based on the quality of questions prepared by the student based on learned content associated with the course in accordance with one illustrative embodiment.

As noted previously, children, students, new recruits, or the like, learn by asking questions. However, in traditional classrooms, it's the teacher who asks more questions than students. Students are encouraged to absorb the knowledge and/or information imparted by teachers for a particular subject or topic of a course so they may answer a teacher's questions to gauge and/or test their comprehension of the subject or topic associated with the course. In an assessment, students are given questions and scored on the quality of their solutions. The scores then determine well the student understands the particular subject or topic of the course.

However, such assessment have certain flaws:
(i) These assessments are one-way system where students may only answer. The students may not ask questions even to clarify question's intent or perspective. Pre-set questions give the direction to students thinking and answers, but every student might be answering based on his/her own understanding of question's intent.

(ii) These assessments are mostly testing the memory power of the students. The assessments are not often measuring the higher order skills of learning: like analysis, synthesis, and problem solving.

(iii) Pre-set questions are designed to test student's knowledge in pre-decided parts of course. The assessments may not assess student's proficiency in complete course.

(iv) Every student is different and unique in some sense. Few students are more analytical than others. That is, some students have a research oriented approach towards the course where other students may prefer reading information like a story. Pre-set questions to test pre-decided aspects of course do not care and/or correlate with such diversity.

(v) All students may be learning all the aspects of the same course but their interest may be in different aspects of course. These assessments may not test every student's creativity, interest level, likes, and/or strengths in that course. From this perspective, same pre-set questions fail to do justice with all the students.

(vi) These assessments do not have any clue of how and to what extent a course is changing a particular student's way of thinking. There is no way to test if a student is really passionate about the course or just an effective story teller to get good marks by writing well-structured answers to questions.

(vii) There are times when the students do guess work and pick random answers to multi-choice or true-false questions in order to finish a test. Sometimes the questions set would be standard pertaining to a course.

(viii) In manual test evaluation cases, questions would be set by one or more teachers and answer sheets would be evaluated by evaluators. Each evaluator would have his/her own approach, understanding of course and perspective towards the question asked, thus the evaluation may not be evenly systematic or correct. Student may be getting an undue advantage or paying a price in this type of evaluation. Worst is, the student may not even know how the evaluation is performed.

As result of such system, the best students are trained to be solution-finders. The students start to solve problems, even if some of these problems are the wrong ones to solve as most of the students fail to have the habit of probing the problem first and asking right questions. Too often, solutions framed without a question are judged by implicit decision criteria that are never vocalized, so students do not understand the teacher's logic and proposed ideas and, as such, the student continue to fail to succeed. Studies show that coming up with the right question involves vigorously thinking through the problem, investigating the problem from various angles, turning closed questions into open-ended ones and prioritizing which are the most important questions to get at the heart of the matter. A further advantage of asking the right question is being able to rank the quality of answers with confidence. Hence, there is a need to have a separate assessment or evaluation system which encourages students to ask the innovative questions and seek the solution in right perspective to further investigate and enhance, if required.

Therefore, the illustrative embodiments provide a student understanding assessment mechanism that prompts the student to prepare a questionnaire rather than ask the student to take a test. Thereby, with the student understanding assessment mechanism, qualities of the questions that are prepared by the student are used to assess the student's true understanding of concepts. The student understanding assessment mechanism causes the student to think thoroughly in order to produce quality questions. The student understanding assessment mechanism enables the student to put forth a more concentrated effort while learning the subject and thus, some quality thoughts to prepare questions. The student understanding assessment mechanism expects to have justification points for each question/answer that student would validate, as well as, forces the student to understand the concepts deeper so as to attain a greater command on the subject.

Before beginning the discussion of the various aspects of the illustrative embodiments in more detail, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As noted above, the illustrative embodiments of the present invention provides a methodology, apparatus, system and computer program product for assessing a student's understanding of a subject or topic of a course based on the quality of questions prepared by a student based on learned content associated with the course. The following illustrates the operations of a student understanding cognitive assessment computing system which prompts a student to prepare a questionnaire rather regarding the subject matter or topic associated with all or a portion of a course. The student understanding cognitive assessment computing system uses one or more qualities of the questions prepared by the student to assess the student's true understanding of concepts. The student understanding cognitive assessment computing system causes the student to think thoroughly in order to produce quality questions. The student understanding cognitive assessment computing system enables the student to put forth a more concentrated effort while learning the subject and thus, some quality thoughts to prepare questions. The student understanding cognitive assessment computing system expects to have justification points for each question/answer that student would validate, as well as, forces the student to understand the concepts deeper so as to attain a greater command on the subject.

FIG. 1 is an example block diagram illustrating components of a student understanding cognitive assessment computing system for assessing a student's understanding of a subject or topic of a course based on the quality of questions prepared by the student based on learned content associated with the course in accordance with one illustrative embodiment. As shown in FIG. 1, student understanding cognitive assessment computing system 100 comprises cognitive engine 102, scoring engine 104, and evaluation database 106. Initially, cognitive engine 102 is trained on course content 108 before or at substantially a same time as student 110 reviews course content 108. Cognitive engine 102 systematically ingests course content 108 on a topic-by-topic basis as per a syllabus structure in order to map the question/answer content with precise topic of the subject of course content 108.

After or at substantially a same time, student 110 is requested, instructed, prompted, or the like, via user interface 112 to review a portion of the course content 108. The portion of course content 108 typically covers a specific topic. The review may include but is not limited to reading the portion of the course content 108, listening to an audio version of the portion of the course content 108, watch a video version of the portion of the course content 108, or the like. Cognitive engine 102 is notified of the request, instruction, prompt, or the like, as well as the topic associated with the portion of the course content. Upon notification, cognitive engine 102 records a start time for student 110 to review the topic associated with the portion of the course content. Upon reaching the end of the audio version or video version of the topic associated with the portion of the course content or, in the case of student 110 reading the topic associated with the portion of the course content, receiving a notification from student 110 indication that student 110 has completed the reading, cognitive engine 102 records a stop time for student 110 to review the topic associated with the portion of the course content. Cognitive engine 102 then establishes a time spent value for student 110 to review the topic associated with the portion of the course content.

At this point, cognitive engine 102 prompts student 110 to generate a set of questions associated with the topic associated with the portion of the course content based on student's 110 understanding of the topic associated with the portion of the course content. For each question generated by student 110, cognitive engine 102 records a time taken to ask the question. Cognitive engine 102 then calculates a comprehension score based the question's content and intent. That is, the comprehension score is determined by the cognitive engine and depends on the particular cognitive engine, i.e. each cognitive engine may calculate the comprehension score differently but common to all cognitive engines is that the comprehension score would be high if all constructs of the asked question are understood well by the cognitive engine and the cognitive engine can successfully make enough sense to produce an answer for the parsed question. Otherwise, the comprehension score would be low. For example, if a student asks a question such as "bjsa jsdcgdjshg ho ashdgjasgd jas dkas?," cognitive engine 102 will calculate a lowest comprehension score. However, if the student asks a question such as "What do you mean by bojmgd the bhrtrtn?," cognitive engine would calculate a higher comprehension score, comparatively, but still would not be good enough to get qualified to be answered.

Based on the calculated comprehension score, cognitive engine 102 determines whether the comprehension score is below a predetermined acceptance level, the predetermined acceptance level indicating that cognitive engine 102 cannot determine an answer for the question based on given training on the associated topic of the subject of course content 108. That is, cognitive engine 102 identifies the question as an "out-of-syllabus" question and student 110 needs to re-phrase the question or ask another question. Thus, cognitive engine 102 returns the question to student 110 with a notification that the question is "out-of-syllabus" and needs to re-phrase the question or ask another question. Cognitive engine 102 reanalyzes the question upon student re-submitting the question.

If cognitive engine 102 determines that the comprehension score is at or above the predetermined acceptance level, cognitive engine 102 determines whether the comprehension score is below a predetermined decisive level indicating that cognitive engine 102 is able to determine an answer for the question but further clarification is required. If cognitive engine 102 determines that the comprehension score is at or above the predetermined acceptance level but below the predetermined decisive level, cognitive engine 102 prompts student 110 with one or more of a validating, confirming, or the like, questions, which may be a yes/no question, true/false question, multiple choice question, re-phrased question, or the like, in order to understand the posed question better. Cognitive engine 102 reanalyzes the question upon student re-submitting the question.

If cognitive engine 102 determines that the comprehension score is at or above the predetermined acceptance level and at or above the predetermined decisive level, cognitive engine 102 records the final question, records the associated comprehension score (a final comprehension score), and generates an answer to the question from the relevant topic content that was initially ingested. Cognitive engine 102 generates an answer with a calculated error of randomized magnitude ranging anywhere from, for example, 10% to 60% by one or more of, for example, omission of core entities, omission of core terms, modification of core entities, modification of core terms, or the like. Cognitive engine 102 then presents the answer with the calculated error of randomized magnitude to student 110. Cognitive engine 102 then prompts student 110 to assess the answer provided by cognitive engine 102 providing an evaluation score ranging, for example, in a range from 0-10, as well as precise feedback as to what is missing or what is wrong in the answer provided by cognitive engine 102. By student 110 providing the evaluation score and the precise feedback, cognitive engine 102 generates a set of validation points for student's 110 understanding of the topic from the asked question. The validation points are generally a feedback of, why the answer was not accurate in case of the given answer was incorrect or why the answer is accurate in case of right answers. For example, if the question is "What is insurance and how many types of insurance are there?," and the answer is "Insurance is a means of protection from XYZ. It is a form of risk management, primarily used to hedge against the risk of a contingent or uncertain loss. An entity which provides insurance is known as an insurer, insurance company, insurance carrier or underwriter. There are many types of insurance, such as Health Insurance, Car Insurance, Home Insurance, Life Insurance, Disability Insurance, or the like. Thus, cognitive engine 102 may generate validation points for above Q&A, such as "What are incorrect facts in the answer?," "What are the missing points in answer?," or the like. Cognitive engine 102 also records a "time taken for evaluation" value that identified the time it takes student 110 to provide the evaluation score and the precise feedback for the answer generated by the cognitive engine 102 for the particular question.

Using the calculated error of randomized magnitude, cognitive engine 102 calculates a "correctness of score" value based on a difference of student's evaluation score and the answer with a calculated error of randomized magnitude. That is, as one example, if cognitive engine 102 introduced a 20% calculated error of randomized magnitude indicating the answer is 20% wrong and 80% correct and student 110 provided an evaluation score of 8 indicating that the answer is 80% correct, then the difference would be 0%. As another example, if cognitive engine 102 introduced a 40% calculated error of randomized magnitude indicating the answer is 40% wrong and 60% correct and student 110 provided an evaluation score of 4 indicating that the answer is 40% correct, then the difference would be 20%. In a similar manner, cognitive engine 102 also generates a "correctness of comments" value is also calculated. That is, cognitive engine knows, for example, which core entities were omitted from the answer, which core terms were omitted from the answer, which core entities were modified in the answer, which core terms were modified in the answer, or the like. Thus, based on the precise feedback provided by student 110, cognitive engine 102 is able to generate a "correctness of comments" value that identifies whether the student's 110 precise feedback correctly identifies the core entities/terms that where omitted/modified in the provided answer.

Cognitive engine 102 then stores all evaluation data in evaluation database 106, the evaluation data including, but not limited to: the time spent value, the initial asked question, the initial comprehension score, the time taken to ask the question, the answer to the one or more validating, confirming, or the like, questions, the final question, the final comprehension score, the answer generated by cognitive engine 102, the calculated error of randomized magnitude, the evaluation score, the precise feedback, the time taken for evaluation value, the set of validation points, the correctness of score value, the correctness of comments value, and a total time to evaluating & validate the answer provided by system, which is an aggregate value.

Utilizing this data, cognitive engine 102 may utilize the evaluation data to adjust the calculated error of randomized magnitude for an answer to a next question asked by student 110. Additionally, after cognitive engine 102 answers all questions posed by student 110, scoring engine 104 utilizes the evaluation data in evaluation database 106 to determine a question quotient value to measure student's 110 efficiency in asking/framing quality questions. Scoring engine 104 determines the question quotient value based on one or more of the initial comprehension score, the time taken to ask the question, the answer to the one or more validating, confirming, or the like, questions, the set of validation points, the final comprehension score, as well as other question quality parameters. Further, after cognitive engine 102 answers all questions posed by student 110, scoring engine 104 utilize the evaluation data in evaluation database 106 to determine an evaluation quotient value to measure student's 110 proficiency in understanding the answers provided by cognitive engine 102. Scoring engine 104 determines the evaluation quotient value based on one or more of the calculated error of randomized magnitude, the answer generated by cognitive engine 102, the evaluation score, the precise feedback, the time taken for evaluation value, the correctness of score value, and the correctness of comments value, as well as other answer quality parameters.

Scoring engine 104 then utilizes the question quotient value, the evaluation quotient value, as well as one or more other values from the evaluation data in evaluation database 106 to establish an understanding score value. As one example, scoring engine 104 determines an understanding score (US) value as follows:

US=30% weightage given to question quotient value+70% weightage given to evaluation quotient value.

As another example, scoring engine 104 determines an understanding score (US) value as follows:

US=20% weightage given to question quotient value+30% weightage given to the correctness of score value+30% weightage given to the correctness of comments value+10% to the calculated error of randomized magnitude(considering complexity).

It should be noted that, the understanding score may not always add up to 100% as the % numbers given to the different factors may vary. Optionally, scoring engine 104 may consider student's 110 profile (age, qualification, experience, or the like) and learning history data to fine tune the understanding score value.

Finally, scoring engine 104 sums all of the understanding score values for all of the questions for the associated topic of the subject of course content 108, thereby forming a final understanding score value. This helps understand the parts of the subject topic covered by student 110. Scoring engine 104 then produces a ranking of all students based on one or more of their associated understanding score, learning completion time, questionnaire preparation, and/or the time taken for evaluation value. The learning completion time is the time by student 110 to complete the learning/course and questionnaire preparation is the time taken by student 110 to prepare the questionnaire. Cognitive engine 102 then displays the ranking produced by scoring engine 104 with the student at the top of the ranking having the best understanding among all the students of the associated topic of the subject of course content 108.

Thus, student understanding cognitive assessment computing system 100 is specifically tailored to assess a student's understanding of a subject or topic of a course based on the quality of questions prepared by a student based on learned content associated with the course. The student understanding cognitive assessment computing system prompts a student to prepare a questionnaire rather regarding the subject matter or topic associated with all or a portion of a course and utilizes one or more qualities of the questions prepared by the student to assess the student's true understanding of concepts. The student understanding cognitive assessment computing system causes the student to think thoroughly in order to produce quality questions and enables the student to put forth a more concentrated effort while learning the subject and thus, some quality thoughts to prepare questions. The student understanding cognitive assessment computing system expects to have justification points for each question/answer that student would validate, as well as, forces the student to understand the concepts deeper so as to attain a greater command on the subject.

Figure 2:
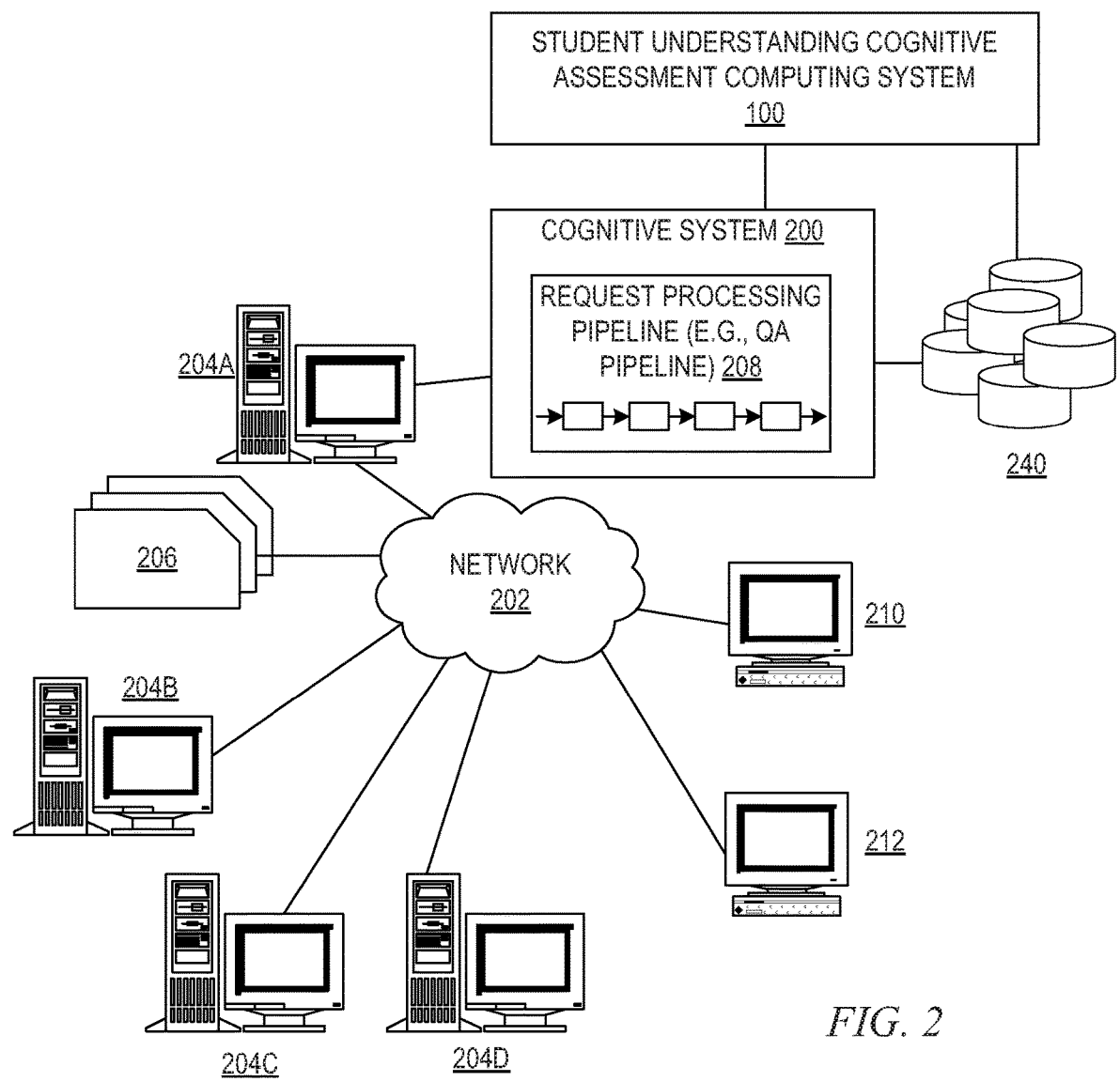
FIG. 2 depicts a schematic diagram of one illustrative embodiment of a cognitive system in a computer network.
Figure 3:
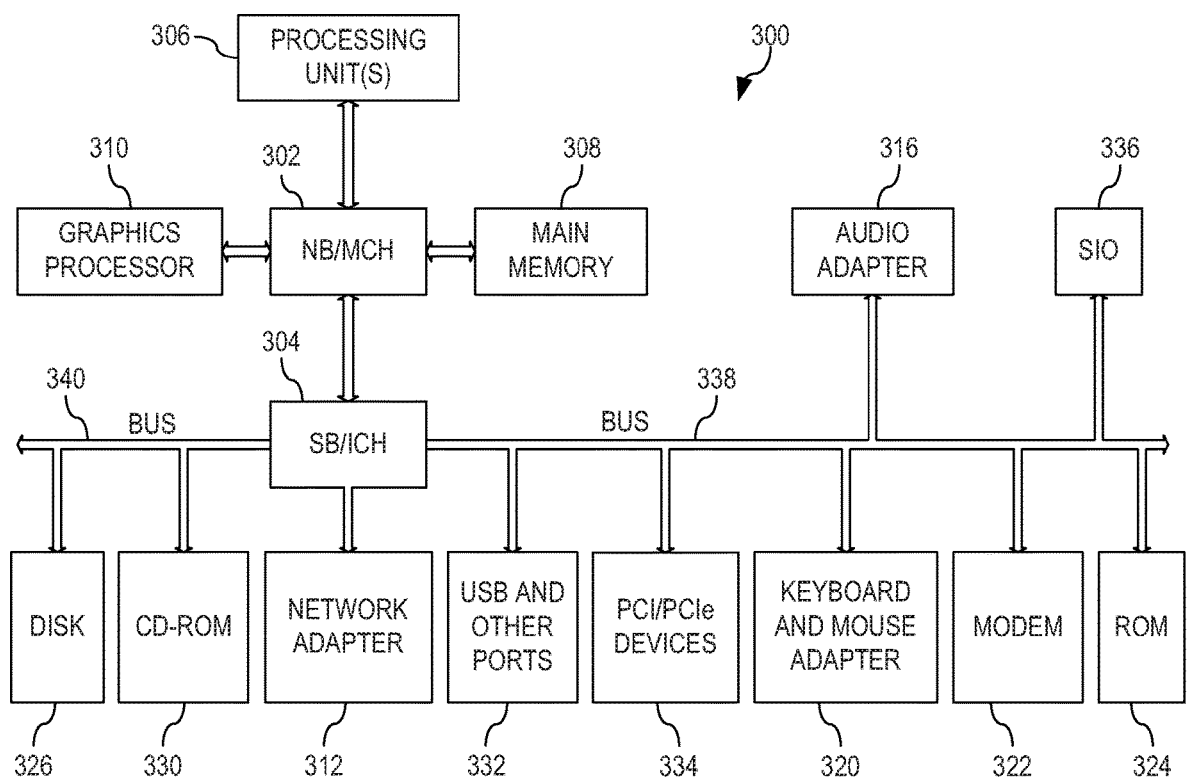
FIG. 3 is a block diagram of an example data processing system in which aspects of the illustrative embodiments are implemented.

It is clear from the above, that the illustrative embodiments may be utilized in many different types of data processing environments. In order to provide a context for the description of the specific elements and functionality of the illustrative embodiments, FIGS. 2-3 are provided hereafter as example environments in which aspects of the illustrative embodiments may be implemented. It should be appreciated that FIGS. 2-3 are only examples and are not intended to assert or imply any limitation with regard to the environments in which aspects or embodiments of the present invention may be implemented. Many modifications to the depicted environments may be made without departing from the spirit and scope of the present invention.

FIGS. 2-3 are directed to describing an example student understanding cognitive assessment computing system for assessing a student's understanding of a subject or topic of a course based on the quality of questions prepared by a student based on learned content associated with the course. The student understanding cognitive assessment computing system that implements a request processing pipeline, request processing methodology, and request processing computer program product with which the mechanisms of the illustrative embodiments are implemented. These requests may be provided as structure request messages, unstructured request messages or any other suitable format for requesting an operation to be performed by the student understanding cognitive assessment computing system. As described in more detail hereafter, the particular application that is implemented in the student understanding cognitive assessment computing system of the present invention is an application for assess a student's understanding of a subject or topic of a course based on the quality of questions prepared by a student based on learned content associated with the course.

It should be appreciated that the student understanding cognitive assessment computing system, while shown as having a single request processing pipeline in the examples hereafter, may in fact have multiple request processing pipelines. Each request processing pipeline may be separately trained and/or configured to process requests associated with different domains or be configured to perform the same or different analysis on input requests, depending on the desired implementation. For example, in some cases, a request processing pipeline may be trained to prompt a student to generate a set of questions associated with a student's understanding of a topic. For each question generated by the student, the request processing pipeline calculates a comprehension score based the question's content and intent. Once each question meets a set of predetermined criteria such that the calculated comprehension score indicates that an answer may be determined for the question, the request processing pipeline generates an answer to the question, which includes a calculated error of randomized magnitude, from relevant topic content that was initially ingested into the request processing pipeline. The answer with the calculated error of randomized magnitude is then presented to the student. Responsive to the student providing an evaluation score and precise feedback, the request processing pipeline generates a set of validation points for the student's understanding of the topic from the asked question, which are then used to calculate a "correctness of score" value and a "correctness of comments" value. Utilizing the correctness of score value and the correctness of comments value as well as other evaluation data, the request processing pipeline determines a question quotient value to measure the student's efficiency in asking/framing quality questions and an evaluation quotient value to measure the student's proficiency in understanding the answers provided by the request processing pipeline. Utilizing the question quotient value, the evaluation quotient value, as well as one or more other values from the evaluation data, the request processing pipeline establishes an understanding score value for the question posed by the student. The request processing pipeline then sums all of the understanding score values for all of the questions posed by the student for the associated topic in order to identify the student's understanding of the associated topic of the subject of the course content.

Moreover, each request processing pipeline may have its own associated corpus or corpora that they ingest and operate on, e.g., one corpus for course information, another corpus for scoring information, or the like, in the above examples. In some cases, the request processing pipelines may each operate on the same domain of requests but may have different configurations, e.g., different annotators or differently trained annotators, such that different analysis and potential responses are generated. The student understanding cognitive assessment computing system may provide additional logic for routing questions to the appropriate request processing pipeline, such as based on a determined domain of the input request, combining and evaluating final results generated by the processing performed by multiple request processing pipelines, and other control and interaction logic that facilitates the utilization of multiple request processing pipelines.

It should be appreciated that while the present invention will be described in the context of the student understanding cognitive assessment computing system implementing one or more request processing pipelines that operate on a request, the illustrative embodiments are not limited to such. Rather, the mechanisms of the illustrative embodiments may operate on requests that are posed as "questions" or formatted as requests for the student understanding cognitive assessment computing system to perform cognitive operations on a specified set of input data using the associated corpus or corpora and the specific configuration information used to configure the student understanding cognitive assessment computing system.

As will be discussed in greater detail hereafter, the illustrative embodiments may be integrated in, augment, and extend the functionality of the request processing pipeline with regard to assessing a student's understanding of a subject or topic of a course based on the quality of questions prepared by a student based on learned content associated with the course. This student understanding assessment is used to assess the student's true understanding of concepts. The student understanding assessment mechanism causes the student to think thoroughly in order to produce quality questions. The student understanding assessment mechanism enables the student to put forth a more concentrated effort while learning the subject and thus, some quality thoughts to prepare questions. The student understanding assessment mechanism expects to have justification points for each question/answer that student would validate, as well as, forces the student to understand the concepts deeper so as to attain a greater command on the subject.

It should be appreciated that the mechanisms described in FIGS. 2-3 are only examples and are not intended to state or imply any limitation with regard to the type of student understanding cognitive assessment computing system mechanisms with which the illustrative embodiments are implemented. Many modifications to the example student understanding cognitive assessment computing system shown in FIGS. 2-3 may be implemented in various embodiments of the present invention without departing from the spirit and scope of the present invention.

As an overview, a student understanding cognitive assessment computing system is a specialized computer system, or set of computer systems, configured with hardware and/or software logic (in combination with hardware logic upon which the software executes) to emulate human cognitive functions. These student understanding cognitive assessment computing systems apply human-like characteristics to conveying and manipulating ideas which, when combined with the inherent strengths of digital computing, can solve problems with high accuracy and resilience on a large scale. A student understanding cognitive assessment computing system performs one or more computer-implemented cognitive operations that approximate a human thought process as well as enable people and machines to interact in a more natural manner so as to extend and magnify human expertise and cognition. A student understanding cognitive assessment computing system comprises artificial intelligence logic, such as natural language processing (NLP) based logic, for example, and machine learning logic, which may be provided as specialized hardware, software executed on hardware, or any combination of specialized hardware and software executed on hardware. The logic of the student understanding cognitive assessment computing system implements the cognitive operation(s), examples of which include, but are not limited to, question answering, identification of related concepts within different portions of content in a corpus, intelligent search algorithms, such as Internet web page searches.

IBM Watson™ is an example of one such student understanding cognitive assessment computing system which can process human readable language and identify inferences between text passages with human-like high accuracy at speeds far faster than human beings and on a larger scale. In general, such student understanding cognitive assessment computing systems are able to perform the following functions:

Navigate the complexities of human language and understanding,
Ingest and process vast amounts of structured and unstructured data,
Generate and evaluate hypothesis,
Weigh and evaluate responses that are based only on relevant evidence,
Provide situation-specific advice, insights, and guidance,
Improve knowledge and learn with each iteration and interaction through machine learning processes,
Enable decision making at the point of impact (contextual guidance),
Scale in proportion to the task,
Extend and magnify human expertise and cognition,
Identify resonating, human-like attributes and traits from natural language,
Deduce various language specific or agnostic attributes from natural language,
High degree of relevant recollection from data points (images, text, voice) (memorization and recall),
Predict and sense with situational awareness that mimic human cognition based on experiences, or
Answer questions based on natural language and specific evidence.

In one aspect, student understanding cognitive assessment computing systems provide mechanisms for responding to requests posed to these student understanding cognitive assessment computing systems using a request processing pipeline and/or process requests which may or may not be posed as natural language requests. The requests processing pipeline is an artificial intelligence application executing on data processing hardware that responds to requests pertaining to a given subject-matter domain presented in natural language. The request processing pipeline receives inputs from various sources including input over a network, a corpus of electronic documents or other data, data from a content creator, information from one or more content users, and other such inputs from other possible sources of input. Data storage devices store the corpus of data. A content creator creates content in a document for use as part of a corpus of data with the request processing pipeline. The document may include any file, text, article, or source of data for use in the requests processing system. For example, a request processing pipeline accesses a body of knowledge about the domain, or subject matter area, e.g., financial domain, educational domain, legal domain, etc., where the body of knowledge (knowledgebase) can be organized in a variety of configurations, e.g., a structured repository of domain-specific information, such as ontologies, or unstructured data related to the domain, or a collection of natural language documents about the domain.

Content users input requests to student understanding cognitive assessment computing systems which implements the request processing pipeline. The request processing pipeline then responds to the requests using the content in the corpus of data by evaluating documents, sections of documents, portions of data in the corpus, or the like. When a process evaluates a given section of a document for semantic content, the process can use a variety of conventions to query such document from the request processing pipeline, e.g., sending the query to the request processing pipeline as a well-formed requests which is then interpreted by the request processing pipeline and a response is provided containing one or more responses to the request. Semantic content is content based on the relation between signifiers, such as words, phrases, signs, and symbols, and what they stand for, their denotation, or connotation. In other words, semantic content is content that interprets an expression, such as by using Natural Language Processing.

As will be described in greater detail hereafter, the request processing pipeline receives a request, parses the request to extract the major features of the request, uses the extracted features to formulate queries, and then applies those queries to the corpus of data. Based on the application of the queries to the corpus of data, the request processing pipeline generates a set of responses to the request, by looking across the corpus of data for portions of the corpus of data that have some potential for containing a valuable response to the request. The request processing pipeline then performs deep analysis on the language of the request and the language used in each of the portions of the corpus of data found during the application of the queries using a variety of reasoning algorithms. There may be hundreds or even thousands of reasoning algorithms applied, each of which performs different analysis, e.g., comparisons, natural language analysis, lexical analysis, or the like, and generates a score. For example, some reasoning algorithms may look at the matching of terms and synonyms within the language of the request and the found portions of the corpus of data. Other reasoning algorithms may look at temporal or spatial features in the language, while others may evaluate the source of the portion of the corpus of data and evaluate its veracity.

As mentioned above, request processing pipeline mechanisms operate by accessing information from a corpus of data or information (also referred to as a corpus of content), analyzing it, and then generating answer results based on the analysis of this data. Accessing information from a corpus of data typically includes: a database query that answers requests about what is in a collection of structured records, and a search that delivers a collection of document links in response to a query against a collection of unstructured data (text, markup language, etc.). Conventional request processing systems are capable of generating answers based on the corpus of data and the input request, verifying answers to a collection of request for the corpus of data, correcting errors in digital text using a corpus of data, and selecting responses to requests from a pool of potential answers, i.e. candidate answers.

FIG. 2 depicts a schematic diagram of one illustrative embodiment of a cognitive system 200 implementing a request processing pipeline 208, which in some embodiments may be a request processing pipeline, in a computer network 202. For purposes of the present description, it will be assumed that the request processing pipeline 208 is implemented as a request processing pipeline that operates on structured and/or unstructured requests in the form of input questions. One example of a question processing operation which may be used in conjunction with the principles described herein is described in U.S. Patent Application Publication No. 2011/0125734, which is herein incorporated by reference in its entirety. Cognitive system 200 is implemented on one or more computing devices 204A-D (comprising one or more processors and one or more memories, and potentially any other computing device elements generally known in the art including buses, storage devices, communication interfaces, and the like) connected to the computer network 202. For purposes of illustration only, FIG. 2 depicts the cognitive system 200 being implemented on computing device 204A only, but as noted above the cognitive system 200 may be distributed across multiple computing devices, such as a plurality of computing devices 204A-D. The network 202 includes multiple computing devices 204A-D, which may operate as server computing devices, and 210-212 which may operate as client computing devices, in communication with each other and with other devices or components via one or more wired and/or wireless data communication links, where each communication link comprises one or more of wires, routers, switches, transmitters, receivers, or the like. In some illustrative embodiments, the cognitive system 200 and networks 202 enables question processing and answer generation (QA) functionality for one or more student understanding cognitive assessment computing system users via their respective computing devices 210-212. In other embodiments, the cognitive system 200 and network 202 may provide other types of cognitive operations including, but not limited to, request processing and cognitive response generation which may take many different forms depending upon the desired implementation, e.g., cognitive information retrieval, training/instruction of users, cognitive evaluation of data, or the like. Other embodiments of the cognitive system 200 may be used with components, systems, subsystems, and/or devices other than those that are depicted herein.

Cognitive system 200 is configured to implement a request processing pipeline 208 that receive inputs from various sources. The requests may be posed in the form of a natural language question, natural language request for information, natural language request for the performance of a cognitive operation, or the like. For example, cognitive system 200 receives input from the network 202, a corpus or corpora of electronic documents 206 or 240, student understanding cognitive assessment computing system users, and/or other data and other possible sources of input. In one embodiment, some or all of the inputs to cognitive system 200 are routed through the network 202. The various computing devices 204A-D on the network 202 include access points for content creators and student understanding cognitive assessment computing system users. Some of the computing devices 204A-D includes devices for a database storing the corpus or corpora of data 206 or 240 (which is shown as a separate entity in FIG. 2 for illustrative purposes only). Portions of the corpus or corpora of data 206 or 240 may also be provided on one or more other network attached storage devices, in one or more databases, or other computing devices not explicitly shown in FIG. 2. The network 202 includes local network connections and remote connections in various embodiments, such that cognitive system 200 may operate in environments of any size, including local and global, e.g., the Internet.

In one embodiment, the content creator creates content in a document of the corpus or corpora of data 206 or 240 for use as part of a corpus of data with cognitive system 200. The document includes any file, text, article, or source of data for use in cognitive system 200. Student understanding cognitive assessment computing system users access cognitive system 200 via a network connection or an Internet connection to the network 202, and requests to cognitive system 200 that are responded to/processed based on the content in the corpus or corpora of data 206 or 240. In one embodiment, the requests are formed using natural language. The cognitive system 200 parses and interprets the request via a pipeline 208, and provides a response to the student understanding cognitive assessment computing system user, e.g., student understanding cognitive assessment computing system user 210, containing one or more responses to the request posed, response to the request, results of processing the request, or the like. In some embodiments, cognitive system 200 provides a response to users in a ranked list of candidate answers/responses while in other illustrative embodiments, cognitive system 200 provides a single final response or a combination of a response and ranked listing of other candidate responses.

Cognitive system 200 implements the pipeline 208 which comprises a plurality of stages for processing a request based on information obtained from the corpus or corpora of data 206 or 240. The pipeline 208 generates responses for the request based on the processing of the request and the corpus or corpora of data 206 or 240.

In some illustrative embodiments, cognitive system 200 may be the IBM Watson™ cognitive system available from International Business Machines Corporation of Armonk, N.Y., which is augmented with the mechanisms of the illustrative embodiments described hereafter. As outlined previously, a pipeline of the IBM Watson™ cognitive system receives a request which it then parses to extract the major features of the request, which in turn are then used to formulate queries that are applied to the corpus or corpora of data 206 or 240. Based on the application of the queries to the corpus or corpora of data 206 or 240, a set of hypotheses, or candidate responses to the request, are generated by looking across the corpus or corpora of data 206 or 240 for portions of the corpus or corpora of data 206 or 240 (hereafter referred to simply as the corpus 206 or 240) that have some potential for containing a valuable response to the response. The pipeline 208 of the IBM Watson™ cognitive system then performs deep analysis on the language of the request and the language used in each of the portions of the corpus 206 or 240 found during the application of the queries using a variety of reasoning algorithms.

The scores obtained from the various reasoning algorithms are then weighted against a statistical model that summarizes a level of confidence that the pipeline 208 of the IBM Watson™ cognitive system 200, in this example, has regarding the evidence that the potential candidate answer is inferred by the request. This process is repeated for each of the candidate answers to generate a ranked listing of candidate answers which may then be presented to the user that submitted the request, e.g., a user of client computing device 210, or from which a final response is selected and presented to the user.

As noted above, while the input to cognitive system 200 from a client device may be posed in the form of a natural language request, the illustrative embodiments are not limited to such. Rather, the request may in fact be formatted or structured as any suitable type of request which may be parsed and analyzed using structured and/or unstructured input analysis, including but not limited to the natural language parsing and analysis mechanisms of a student understanding cognitive assessment computing system such as IBM Watson™, to determine the basis upon which to perform cognitive analysis and providing a result of the cognitive analysis. In the case of a student understanding cognitive assessment computing system, this analysis may involve processing course records, course documentation from one or more corpora, and the like, to provide a student understanding cognitive assessment computing system result. In particular, the mechanisms of student understanding cognitive assessment computing system may prompt a student to generate a set of questions associated with a student's understanding of a topic. For each question generated by the student, the request processing pipeline calculates a comprehension score based the question's content and intent. Once each question meets a set of predetermined criteria such that the calculated comprehension score indicates that an answer may be determined for the question, the request processing pipeline generates an answer to the question, which includes a calculated error of randomized magnitude, from relevant topic content that was initially ingested into the request processing pipeline. The answer with the calculated error of randomized magnitude is then presented to the student. Responsive to the student providing an evaluation score and precise feedback, the request processing pipeline generates a set of validation points for the student's understanding of the topic from the asked question, which are then used to calculate a "correctness of score" value and a "correctness of comments" value. Utilizing the correctness of score value and the correctness of comments value as well as other evaluation data, the request processing pipeline determines a question quotient value to measure the student's efficiency in asking/framing quality questions and an evaluation quotient value to measure the student's proficiency in understanding the answers provided by the request processing pipeline. Utilizing the question quotient value, the evaluation quotient value, as well as one or more other values from the evaluation data, the request processing pipeline establishes an understanding score value for the question posed by the student. The request processing pipeline then sums all of the understanding score values for all of the questions posed by the student for the associated topic in order to identify the student's understanding of the associated topic of the subject of the course content.

In the context of the present invention, cognitive system 200 may provide a cognitive functionality for assessing a student's understanding of a subject or topic of a course based on the quality of questions prepared by a student based on learned content associated with the course. For example, depending upon the particular implementation, as shown in FIG. 2, cognitive system 200 is further augmented, in accordance with the mechanisms of the illustrative embodiments, to include logic implemented in specialized hardware, software executed on hardware, or any combination of specialized hardware and software executed on hardware, for implementing student understanding cognitive assessment computing system 100. As described previously, student understanding cognitive assessment computing system 100 prompts a student to generate a set of questions associated with a student's understanding of a topic. For each question generated by the student, the request processing pipeline calculates a comprehension score based the question's content and intent. Once each question meets a set of predetermined criteria such that the calculated comprehension score indicates that an answer may be determined for the question, the request processing pipeline generates an answer to the question, which includes a calculated error of randomized magnitude, from relevant topic content that was initially ingested into the request processing pipeline. The answer with the calculated error of randomized magnitude is then presented to the student. Responsive to the student providing an evaluation score and precise feedback, the request processing pipeline generates a set of validation points for the student's understanding of the topic from the asked question, which are then used to calculate a "correctness of score" value and a "correctness of comments" value. Utilizing the correctness of score value and the correctness of comments value as well as other evaluation data, the request processing pipeline determines a question quotient value to measure the student's efficiency in asking/framing quality questions and an evaluation quotient value to measure the student's proficiency in understanding the answers provided by the request processing pipeline. Utilizing the question quotient value, the evaluation quotient value, as well as one or more other values from the evaluation data, the request processing pipeline establishes an understanding score value for the question posed by the student. The request processing pipeline then sums all of the understanding score values for all of the questions posed by the student for the associated topic in order to identify the student's understanding of the associated topic of the subject of the course content.

As noted above, the mechanisms of the illustrative embodiments are rooted in the computer technology arts and are implemented using logic present in such computing or data processing systems. These computing or data processing systems are specifically configured, either through hardware, software, or a combination of hardware and software, to implement the various operations described above. As such, FIG. 3 is provided as an example of one type of data processing system in which aspects of the present invention may be implemented. Many other types of data processing systems may be likewise configured to specifically implement the mechanisms of the illustrative embodiments.

FIG. 3 is a block diagram of an example data processing system in which aspects of the illustrative embodiments are implemented. Data processing system 300 is an example of a computer, such as server 204A or client 210 in FIG. 2, in which computer usable code or instructions implementing the processes for illustrative embodiments of the present invention are located. In one illustrative embodiment, FIG. 3 represents a server computing device, such as a server 204, which, which implements a cognitive system 200 and QA system pipeline 208 augmented to include the additional mechanisms of the illustrative embodiments described hereafter.

In the depicted example, data processing system 300 employs a hub architecture including North Bridge and Memory Controller Hub (NB/MCH) 302 and South Bridge and Input/Output (I/O) Controller Hub (SB/ICH) 304. Processing unit 306, main memory 308, and graphics processor 310 are connected to NB/MCH 302. Graphics processor 310 is connected to NB/MCH 302 through an accelerated graphics port (AGP).

In the depicted example, local area network (LAN) adapter 312 connects to SB/ICH 304. Audio adapter 316, keyboard and mouse adapter 320, modem 322, read only memory (ROM) 324, hard disk drive (HDD) 326, CD-ROM drive 330, universal serial bus (USB) ports and other communication ports 332, and PCI/PCIe devices 334 connect to SB/ICH 304 through bus 338 and bus 340. PCI/PCIe devices may include, for example, Ethernet adapters, add-in cards, and PC cards for notebook computers. PCI uses a card bus controller, while PCIe does not. ROM 324 may be, for example, a flash basic input/output system (BIOS).

HDD 326 and CD-ROM drive 330 connect to SB/ICH 304 through bus 340. HDD 326 and CD-ROM drive 330 may use, for example, an integrated drive electronics (IDE) or serial advanced technology attachment (SATA) interface. Super I/O (SIO) device 336 is connected to SB/ICH 304.

An operating system runs on processing unit 306. The operating system coordinates and provides control of various components within the data processing system 300 in FIG. 3. As a client, the operating system is a commercially available operating system such as Microsoft® Windows 10®. An object-oriented programming system, such as the Java™ programming system, may run in conjunction with the operating system and provides calls to the operating system from Java™ programs or applications executing on data processing system 300.

As a server, data processing system 300 may be, for example, an IBM® eServer™ System p® computer system, running the Advanced Interactive Executive (AIX®) operating system or the LINUX® operating system. Data processing system 300 may be a symmetric multiprocessor (SMP) system including a plurality of processors in processing unit 306. Alternatively, a single processor system may be employed.

Instructions for the operating system, the object-oriented programming system, and applications or programs are located on storage devices, such as HDD 326, and are loaded into main memory 308 for execution by processing unit 306. The processes for illustrative embodiments of the present invention are performed by processing unit 306 using computer usable program code, which is located in a memory such as, for example, main memory 308, ROM 324, or in one or more peripheral devices 326 and 330, for example.

A bus system, such as bus 338 or bus 340 as shown in FIG. 3, is comprised of one or more buses. Of course, the bus system may be implemented using any type of communication fabric or architecture that provides for a transfer of data between different components or devices attached to the fabric or architecture. A communication unit, such as modem 322 or network adapter 312 of FIG. 3, includes one or more devices used to transmit and receive data. A memory may be, for example, main memory 308, ROM 324, or a cache such as found in NB/MCH 302 in FIG. 3.

Those of ordinary skill in the art will appreciate that the hardware depicted in FIGS. 2 and 3 may vary depending on the implementation. Other internal hardware or peripheral devices, such as flash memory, equivalent non-volatile memory, or optical disk drives and the like, may be used in addition to or in place of the hardware depicted in FIGS. 2 and 3. Also, the processes of the illustrative embodiments may be applied to a multiprocessor data processing system, other than the SMP system mentioned previously, without departing from the spirit and scope of the present invention.

Moreover, the data processing system 300 may take the form of any of a number of different data processing systems including client computing devices, server computing devices, a tablet computer, laptop computer, telephone or other communication device, a personal digital assistant (PDA), or the like. In some illustrative examples, data processing system 300 may be a portable computing device that is configured with flash memory to provide non-volatile memory for storing operating system files and/or user-generated data, for example. Essentially, data processing system 300 may be any known or later developed data processing system without architectural limitation.

Figure 4A:
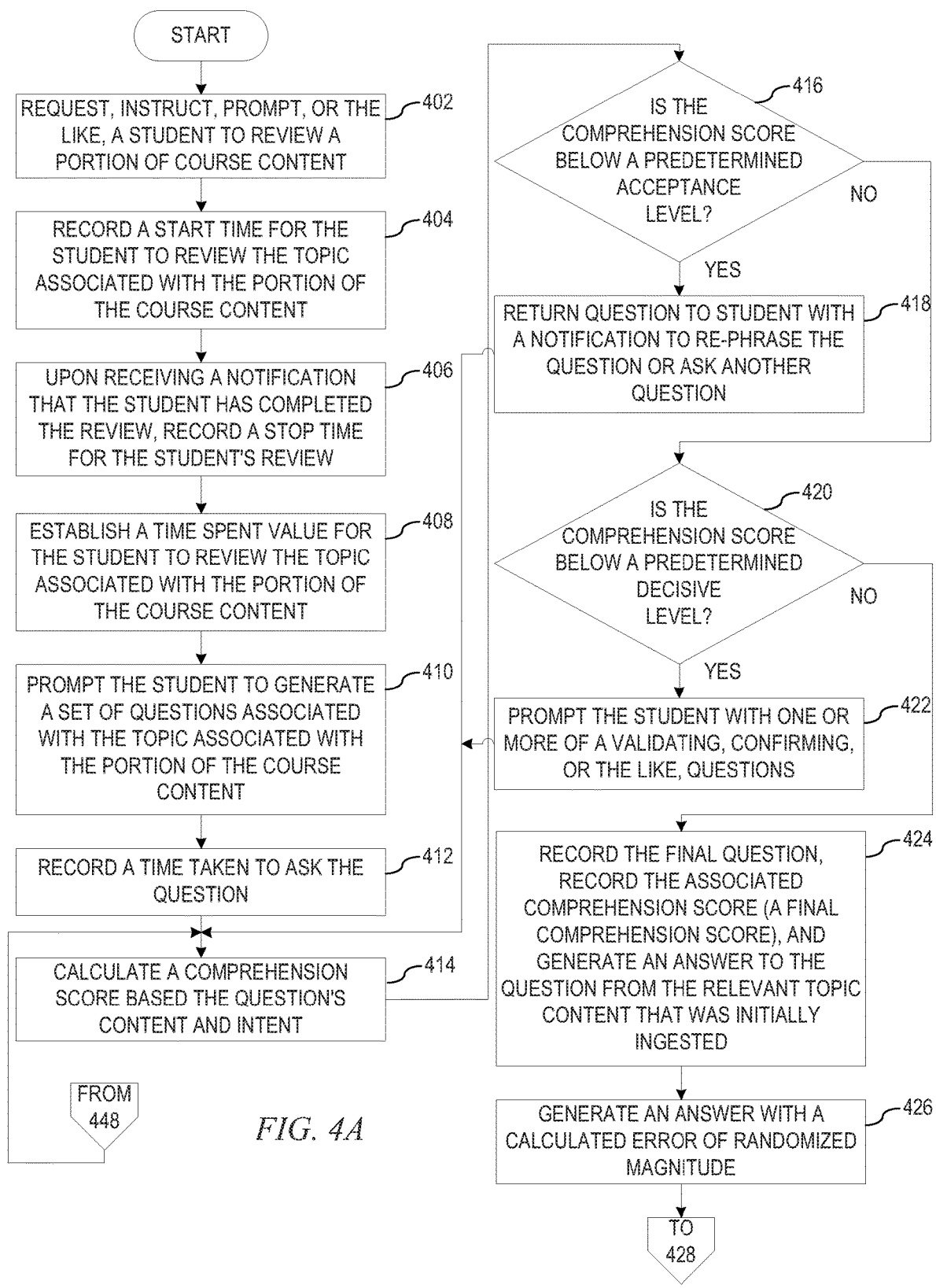
FIGS. 4A-4B depict a flowchart outlining example operations performed by a student understanding cognitive assessment computing system in assessing a student's understanding of a subject or topic of a course based on the quality of questions prepared by a student based on learned content associated with the course in accordance with one illustrative embodiment.
Figure 4B:
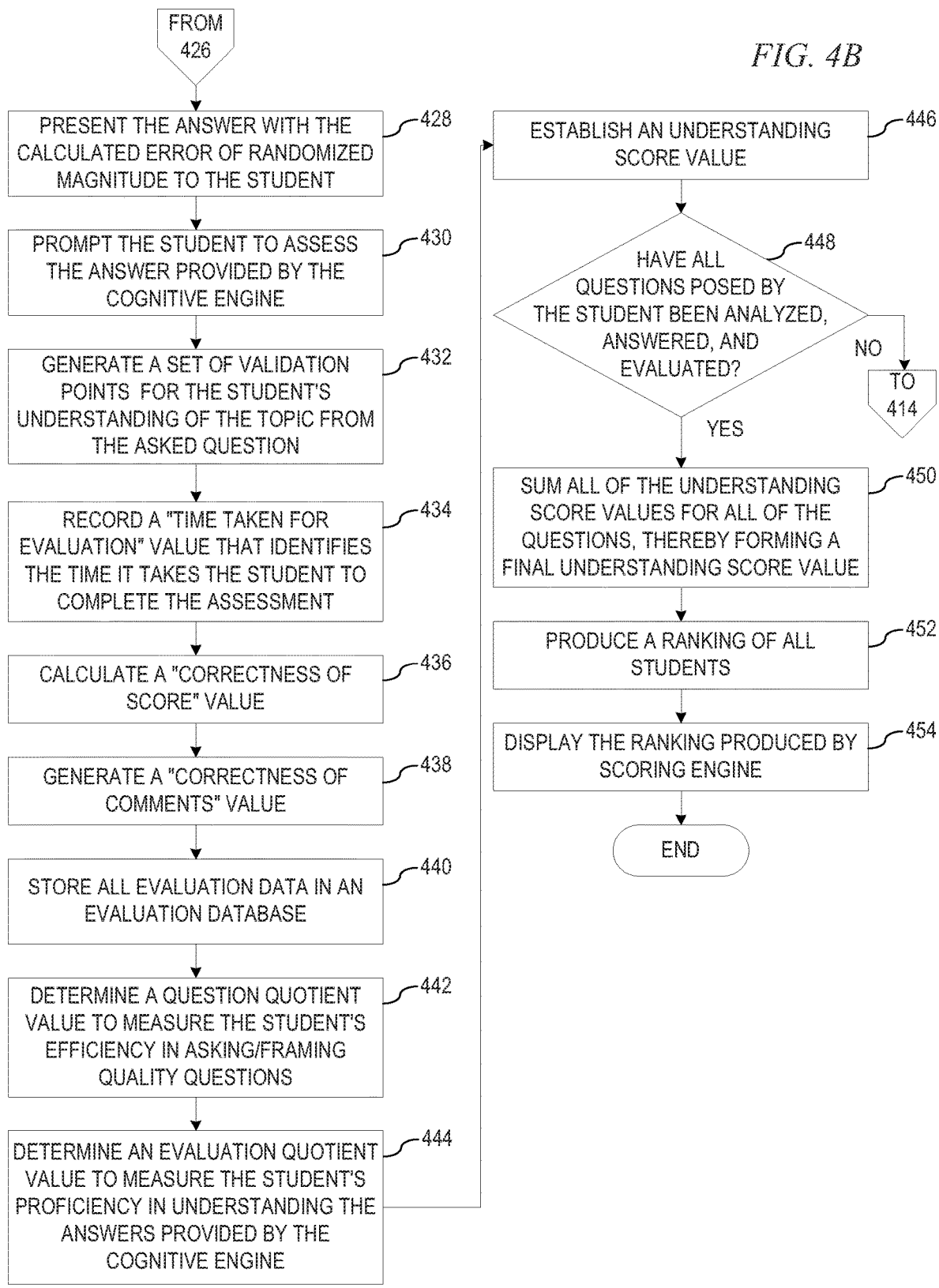

FIGS. 4A-4B depict a flowchart outlining example operations performed by a student understanding cognitive assessment computing system in assessing a student's understanding of a subject or topic of a course based on the quality of questions prepared by a student based on learned content associated with the course in accordance with one illustrative embodiment. As the exemplary operation begins, the a cognitive engine of the student understanding cognitive assessment computing system requests, instructs, prompts, or the like, a student to review a portion of course content (step 402) at which time the cognitive engine records a start time for the student to review the topic associated with the portion of the course content (step 404). The portion of the course content typically covers a specific topic. Upon receiving a notification that the student has completed the review, which may be indicated by the student reaching the end of the audio version or video version of the topic associated with the portion of the course content or, in the case of the student reading the topic associated with the portion of the course content, receiving the notification directed from the student, the cognitive engine records a stop time for the student's review of the topic associated with the portion of the course content (step 406). The cognitive engine then establishes a time spent value for the student to review the topic associated with the portion of the course content (step 408).

At this point, the cognitive engine prompts the student to generate a set of questions associated with the topic associated with the portion of the course content based on the student's understanding of the topic associated with the portion of the course content (step 410). For each question generated by the student, the cognitive engine records a time taken to ask the question (step 412). The cognitive engine then calculates a comprehension score based the question's content and intent (step 414). Based on the calculated comprehension score, the cognitive engine determines whether the comprehension score is below a predetermined acceptance level (step 416), the predetermined acceptance level indicating that the cognitive engine cannot determine an answer for the question based on given training on the associated topic of the subject of the course content. If at step 416 the cognitive system determined that the comprehension score is below a predetermined acceptance level, the cognitive engine identifies the question as an "out-of-syllabus" question and that the student needs to re-phrase the question or ask another question. Thus, the cognitive engine returns the question to the student with a notification that the question is "out-of-syllabus" and needs to re-phrase the question or ask another question (step 418), with the operation returning to step 414 thereafter.

If at step 416 the cognitive engine determines that the comprehension score is at or above the predetermined acceptance level, the cognitive system determines whether the comprehension score is below a predetermined decisive level (step 420), the predetermined decisive level indicating that the cognitive engine is able to determine an answer for the question but further clarification is required. If at step 420 the cognitive engine determines that the comprehension score is at or above the predetermined acceptance level but below the predetermined decisive level, the cognitive engine prompts the student with one or more of a validating, confirming, or the like, questions (step 422), with the operation returning to step 414 thereafter. The one or more of a validating, confirming, or the like, questions may be a yes/no question, true/false question, multiple choice question, re-phrased question, or the like, in order to understand the posed question better.

If at step 420 the cognitive engine determines that the comprehension score is at or above the predetermined acceptance level and at or above the predetermined decisive level, the cognitive system records the final question, records the associated comprehension score (a final comprehension score), and generates an answer to the question from the relevant topic content that was initially ingested (step 424). The cognitive engine then generates an answer with a calculated error of randomized magnitude (step 426), the calculated error of randomized magnitude ranging anywhere from, for example, 10% to 60% by one or more of, for example, omission of core entities, omission of core terms, modification of core entities, modification of core terms, or the like. The cognitive engine then presents the answer with the calculated error of randomized magnitude to the student (step 428). The cognitive engine then prompts the student to assess the answer provided by the cognitive engine (step 430), the assessment providing an evaluation score ranging, for example, in a range from 0-10, as well as precise feedback as to what is missing or what is wrong in the answer provided by the cognitive engine. By the student providing the evaluation score and the precise feedback, the cognitive engine generates a set of validation points for the student's understanding of the topic from the asked question (step 432). The cognitive engine also records a "time taken for evaluation" value that identified the time it takes the student to provide the evaluation score and the precise feedback for the answer generated by the cognitive engine for the particular question (step 434).

Using the calculated error of randomized magnitude, the cognitive engine calculates a "correctness of score" value (step 436) based on a difference of student's evaluation score and the answer with a calculated error of randomized magnitude. In a similar manner, the cognitive engine generates a "correctness of comments" value (step 438) based on a difference of the precise feedback provided by the student and the one or more of the core entities were omitted from the answer, the core terms were omitted from the answer, the core entities were modified in the answer, the core terms were modified in the answer, or the like, which the cognitive engine introduced into the answer. The cognitive engine then stores all evaluation data in an evaluation database (step 440), the evaluation data including, but not limited to: the time spent value, the initial asked question, the initial comprehension score, the time taken to ask the question, the answer to the one or more validating, confirming, or the like, questions, the final question, the final comprehension score, the answer generated by the cognitive engine, the calculated error of randomized magnitude, the evaluation score, the precise feedback, the time taken for evaluation value, the set of validation points, the correctness of score value, the correctness of comments value, and the total time to evaluating & validate the answer provided by system, which is an aggregate value.

A scoring engine of the student understanding cognitive assessment computing system then utilizes the evaluation data in the evaluation database to determine a question quotient value to measure the student's efficiency in asking/framing quality questions (step 442). The scoring engine determines the question quotient value based on one or more of the initial comprehension score, the time taken to ask the question, the answer to the one or more validating, confirming, or the like, questions, the set of validation points, the final comprehension score, as well as other question quality parameters. The scoring engine also utilizes the evaluation data in the evaluation database to determine an evaluation quotient value to measure the student's proficiency in understanding the answers provided by the cognitive engine (step 444). The scoring engine determines the evaluation quotient value based on one or more of the calculated error of randomized magnitude, the answer generated by the cognitive engine, the evaluation score, the precise feedback, the time taken for evaluation value, the correctness of score value, and the correctness of comments value, as well as other answer quality parameters.

The scoring engine then utilizes the question quotient value, the evaluation quotient value, as well as one or more other values from the evaluation data in the evaluation database to establish an understanding score value (step 446). Optionally, in determining the understanding score, the scoring engine may consider the student's profile (age, qualification, experience, or the like) and learning history data to fine tune the understanding score value. The cognitive engine then determines whether all of the questions posed by the student have been analyzed, answered, and evaluated (step 448). If at step 448 there are more questions, then the operation returns to step 414. If at step 448 there are no more questions, the scoring engine sums all of the understanding score values for all of the questions for the associated topic of the subject of the course content, thereby forming a final understanding score value (step 450). The final understanding score value helps understand the parts of the subject topic covered by the student. The scoring engine then produces a ranking of all students (step 452) based on one or more of their associated understanding score, learning completion time, time, questionnaire preparation, and/or the time taken for evaluation value. The cognitive engine then displays the ranking produced by scoring engine (step 454) to an instructor, teacher, professor, or the like, with the student at the top of the ranking having the best understanding among all the students of the associated topic of the subject of the course content. The operation ends thereafter.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless 1/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, comprising:
executing, by at least one processor of the data processing system, computer executable instructions stored in at least one memory of the data processing system that cause the data processing system to provide a student understanding cognitive assessment computing system;
ingesting, by a cognitive engine, of the student understanding cognitive assessment computing system, course content data on a topic-by-topic basis as per a syllabus structure to generate a mapping of question/answer content with the course content according to topic;
training machine learning logic of the cognitive engine using reasoning algorithms, based on the ingested course content data, to evaluate one or more input questions that are input to the cognitive engine and generate a corresponding comprehension score for each of the one or more input questions,
wherein each comprehension score provides a qualitative measure of content of a corresponding input question;
prompting, via a user interface of the data processing system, the student to complete a review of a portion of the course content via the user interface and to input a set of one or more questions, generated by the student and input via the user interface, associated with a topic corresponding to the portion of the course content based on the student's understanding of the portion of the course content;
wherein, for each question in the set of one or more questions input by the student, the student understanding cognitive assessment computing system:
records a time taken value representing a time taken by the student to generate the question in the evaluation database;
determines, by the trained machine learning logic of the student understanding cognitive assessment computing system processing content of the question using reasoning algorithms, a comprehension score based on the content of the question and the training of the machine learning logic;
prompts, via the user interface, responsive to the comprehension score not meeting one or more criteria, the student to provide additional input to satisfy the one or more criteria;
generates, responsive to the comprehension score being at or above a predetermined decisive level criterion, a first answer to the question;
modifies the first answer by introducing error into the content of the first answer, based on a calculated error of randomized magnitude and relevant topic content initially ingested by the student understanding cognitive assessment computing system, to thereby generate a second answer having missing or incorrect content from the first answer;
prompts, via the user interface, the student to input an assessment of the second answer to the question, wherein the students assessment to the second answer to the question comprises an evaluation score and feedback that indicates what the student regards as missing in the answer or what is incorrect in the answer; and
responsive to the student assessing each second answer to each question in the set of questions, establishing, by the scoring engine, a final understanding score value for the set of questions based on the assessment provided by the student indicating an understanding of the portion of the course content by the student, wherein the final understanding score value is comprised of a set of understanding score values for each question, in the set of one or more questions generated and input by the student, and wherein each understanding score value, for each question in the set of one or more questions, is established by:
  determining a question quotient value based on the comprehension score and the time taken value;
  determining an evaluation quotient value based on the calculated error of randomized magnitude, the evaluation score, and an evaluation quotient value based on the feedback provided by the student; and
  generating the understanding score value utilizing the question quotient value and the evaluation quotient value.

2. The method of claim 1, wherein the completion of the review of the portion of the course content is indicated by at least one of the student reaching an end of an audio version of the portion of the course content, reaching an end of a video version of the portion of the course content, or receiving a notification direct from the student via the user interface.

3. The method of claim 1, wherein the predetermined acceptance level indicates that the student understanding cognitive assessment computing system is unable to determine an answer for the question based on a training of the student understanding cognitive assessment computing system on the portion of the course content.

4. The method of claim 1, wherein the predetermined decisive level indicates that the student understanding cognitive assessment computing system is able to determine an answer for the question but further clarification is required.

5. The method of claim 1, wherein modifying the first answer by introducing error into the content of the first answer comprises introducing, into the first answer, at least one of: an omission of core entities, an omission of core terms, a modification of core entities, or a modification of core terms.

6. The method of claim 1, further comprising:
  generating a correctness of score value based on a comparison of the evaluation score and the calculated error of randomized magnitude; and
  generating a correctness of comments value based on a comparison of the feedback provided by the student and one or more of the core entities omitted from the answer, the core terms omitted from the answer, the core entities modified in the answer, or the core terms modified in the answer introduced into the answer.

7. A computer program product comprising a computer readable storage medium having a student understanding cognitive assessment computing system stored therein, wherein the student understanding cognitive assessment computing system executes on a data processing system and causes the data processing system to:
  ingest, by a cognitive engine, of the student understanding cognitive assessment computing system, course content data on a topic-by-topic basis as per a syllabus structure to generate a mapping of question/answer content with the course content according to topic;
  train machine learning logic of the cognitive engine using reasoning algorithms, based on the ingested course content data, to evaluate one or more input questions that are input to the cognitive engine and generate a corresponding comprehension score for each of the one or more input questions, wherein each comprehension score provides a qualitative measure of content of a corresponding input question;
  prompt, via a user interface of the data processing system, the student to complete a review of a portion of the course content via the user interface and to input a set of one or more questions, generated by the student and input via the user interface, associated with a topic corresponding to the portion of the course content based on the student's understanding of the portion of the course content;
  wherein, for each question in the set of one or more questions input by the student, the student understanding cognitive assessment computing system:
    records a time taken value representing a time taken by the student to generate the question in the evaluation database;
    determines, by the trained machine learning logic of the student understanding cognitive assessment computing system processing content of the question using reasoning algorithms, a comprehension score based on the content of the question and the training of the machine learning logic;
    prompts, via the user interface, responsive to the comprehension score not meeting one or more criteria, the student to provide additional input to satisfy the one or more criteria;
  generates, a predetermined decisive level criterion, a first answer to the question;
  modifies the first answer by introducing error into the content of the first answer based on a calculated error of randomized magnitude and relevant topic content initially ingested by the student understanding cognitive assessment computing system, to thereby generate a second answer having missing or incorrect content from the first answer;
  prompts, via the user interface, the student to input an assessment of the second answer to the question, wherein the students assessment to the second answer to the question comprises an evaluation score and feedback that indicates what the student regards as missing in the answer or what is incorrect in the answer; and
  responsive to the student assessing each second answer to each question in the set of questions, establish, by the scoring engine, a final understanding score value for the set of questions based on the assessment provided by the student indicating an understanding of the portion of the course content by the student, wherein the final understanding score value is comprised of a set of understanding score values for each question, in the set of one or more questions generated and input by the student, and
  wherein each understanding score value, for each question in the set of one or more questions, is established by:
    determining a question quotient value based on the comprehension score and the time taken value;
    determining an evaluation quotient value based on the calculated error of randomized magnitude, the evaluation score, and an evaluation quotient value based on the feedback provided by the student; and
    generating the understanding score value utilizing the question quotient value and the evaluation quotient value.

8. The computer program product of claim 7, wherein the completion of the review of the portion of the course content is indicated by at least one of the student reaching an end of an audio version of the portion of the course content, reaching an end of a video version of the portion of the course content, or receiving a notification direct from the student via the user interface.

9. The computer program product of claim 7, wherein the predetermined acceptance level indicates that the student understanding cognitive assessment computing system is unable to determine an answer for the question based on a given training of the student understanding cognitive assessment computing system on the portion of the course content.

10. The computer program product of claim 7, wherein the predetermined decisive level indicates that the student understanding cognitive assessment computing system is able to determine an answer for the question but further clarification is required.

11. The computer program product of claim 7, wherein modifying the first answer by introducing error into the content of the first answer comprises introducing, into the first answer, at least one of: an omission of core entities, an omission of core terms, a modification of core entities, or a modification of core terms.

12. The computer program product of claim 7, wherein the student understanding cognitive assessment computing system further causes the data processing system to:
generate a correctness of score value based on a comparison of the evaluation score and the calculated error of randomized magnitude; and
generate a correctness of comments value based on a comparison of the feedback provided by the student and one or more of the core entities omitted from the answer, the core terms omitted from the answer, the core entities modified in the answer, or the core terms modified in the answer introduced into the answer.

13. A data processing system comprising:
at least one processor; and
at least one memory coupled to the at least one processor, wherein the at least one memory has a student understanding cognitive assessment computing system stored therein, wherein the student understanding cognitive assessment computing system executes on the at least one processor and causes the at least one processor to:
ingest, by a cognitive engine, of the student understanding cognitive assessment computing system, course content data on a topic-by-topic basis as per a syllabus structure to generate a mapping of question/answer content with the course content according to topic;
train machine learning logic of the cognitive engine using reasoning algorithms, based on the ingested course content data, to evaluate one or more input questions that are input to the cognitive engine and generate a corresponding comprehension score for each of the one or more input questions, wherein each comprehension score provides a qualitative measure of content of a corresponding input question;
prompt, via a user interface of the data processing system, the student to complete a review of a portion of the course content via the user interface and to input a set of one or more questions, generated by the student and input via the user interface, associated with a topic corresponding to the portion of the course content based on the student's understanding of the portion of the course content;
wherein, for each question in the set of one or more questions input by the student, the student understanding cognitive assessment computing system:
records a time taken value representing a time taken by the student to generate the question in the evaluation database;
determines, by the trained machine learning logic of the student understanding cognitive assessment computing system processing content of the question using reasoning algorithms, a comprehension score based on the content of the question and the training of the machine learning logic;
prompts, via the user interface, responsive to the comprehension score not meeting one or more criteria, the student to provide additional input to satisfy the one or more criteria;
generates, a predetermined decisive level criterion, a first answer to the question;
modifies the first answer by introducing error into the content of the first answer based on a calculated error of randomized magnitude and relevant topic content initially ingested by the student understanding cognitive assessment computing system, to thereby generate a second answer having missing or incorrect content from the first answer;
prompts, via the user interface, the student to input an assessment of the second answer to the question, wherein the student's assessment to the second answer to the question comprises an evaluation score and feedback that indicates what the student regards as missing in the answer or what is incorrect in the answer; and
responsive to the student assessing each second answer to each question in the set of questions, establish, by the scoring engine, a final understanding score value for the set of questions based on the assessment provided by the student indicating an understanding of the portion of the course content by the student, wherein the final understanding score value is comprised of a set of understanding score values for each question, in the set of one or more questions generated and input by the student, and wherein each understanding score value, for each question in the set of one or more questions, is established by:
determining a question quotient value based on the comprehension score and the time taken value;
determining an evaluation quotient value based on the calculated error of randomized magnitude, the evaluation score, and an evaluation quotient value based on the feedback provided by the student; and
generating the understanding score value utilizing the question quotient value and the evaluation quotient value.

14. The data processing system of claim 13, wherein the completion of the review of the portion of the course content is indicated by at least one of the student reaching an end of an audio version of the portion of the course content, reaching an end of a video version of the portion of the course content, or receiving a notification direct from the student via the user interface.

15. The data processing system of claim 13, wherein the predetermined acceptance level indicates that the student understanding cognitive assessment computing system is unable to determine an answer for the question based on a given training of the student understanding cognitive assessment computing system on the portion of the course content.

16. The data processing system of claim 13, wherein the predetermined decisive level indicates that the student understanding cognitive assessment computing system is able to determine an answer for the question but further clarification is required.

17. The data processing system of claim 13, wherein modifying the first answer by introducing error into the content of the first answer comprises introducing, into the first answer, at least one of: an omission of core entities, an omission of core terms, a modification of core entities, or a modification of core terms.

18. The data processing system of claim 13, wherein the student understanding cognitive assessment computing system further causes the at least one processor to:
    generate a correctness of score value based on a comparison of the evaluation score and the calculated error of randomized magnitude; and
    generate a correctness of comments value based on a comparison of the feedback provided by the student and one or more of the core entities omitted from the answer, the core terms omitted from the answer, the core entities modified in the answer, or the core terms modified in the answer introduced into the answer.

19. The method of claim 1, wherein prompting the student, responsive to the comprehension score not meeting one or more criteria, comprises:
    responsive to the comprehension score being below a predetermined acceptance level, prompting, by the cognitive engine, the student to rephrase the question or ask another question; and
    responsive to the comprehension score being at or above the predetermined acceptance level and below a predetermined decisive level, prompting the student with a validation question or a confirming question.

20. The computer program product of claim 7, wherein prompting the student, responsive to the comprehension score not meeting one or more criteria, comprises:
    responsive to the comprehension score being below a predetermined acceptance level, prompting, by the cognitive engine, the student to rephrase the question or ask another question; and
    responsive to the comprehension score being at or above the predetermined acceptance level and below a predetermined decisive level, prompting the student with a validation question or a confirming question.

\* \* \* \* \*